J. P. HAFFNER.
VALVE FOR DOMESTIC AND FARM WATER TANKS.
APPLICATION FILED MAR. 29, 1918.
1,302,033.
Patented Apr. 29, 1919.
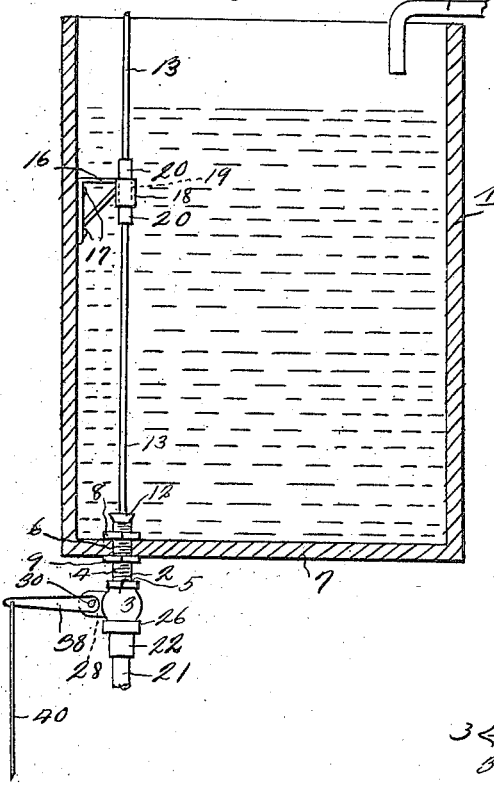
Fig. 1.
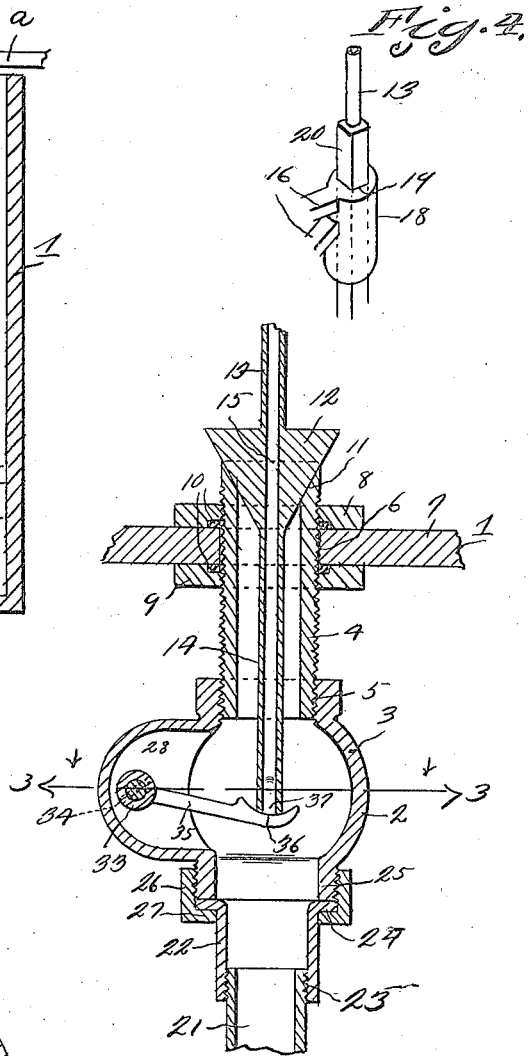
Fig. 4.
Fig. 2.
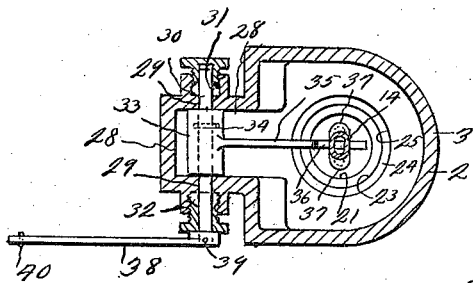
Fig. 3.
Fig. 5.
Inventor
J. P. Haffner
Witnesses

UNITED STATES PATENT OFFICE.

JACOB P. HAFFNER, OF HOWARDSVILLE, VIRGINIA.

VALVE FOR DOMESTIC AND FARM WATER-TANKS.

1,302,033.

Specification of Letters Patent.

Patented Apr. 29, 1919.

Application filed March 29, 1918. Serial No. 225,465.

*To all whom it may concern:*

Be it known that I, JACOB P. HAFFNER, a citizen of the United States, residing at Howardsville, in the county of Albemarle, State of Virginia, have invented a new and useful Valve for Domestic and Farm Water-Tanks; and I do hereby declare the following to be a full, clear, and exact description of the invention, such as will enable others skilled in the art to which it appertains to make and use the same.

This invention relates to an improved valve for domestic and farm water tanks, and one of the objects of the invention is the provision of an improved valve having means, which, when the valve is open to allow the escape of water from the tank to the supply system, air is allowed to enter the valve casing, in fact the pipe below the valve, so that the pipe connections between the main supply tank and auxiliary tanks (not shown) may thoroughly drain, thereby preventing freezing of the pipe and the valve.

A further object of the invention is the provision of improved means for actuating the valve.

A further object of the invention is to provide a valve of this kind which is simple, efficient and practical in construction, and may be manufactured at a small cost and sold at a reasonable profit.

In practical fields the details of construction may necessitate alterations falling within the scope of what is claimed.

The invention comprises further features and combination of parts as hereinafter set forth shown in the drawings and claimed.

In the drawings:—

Figure 1 is a vertical sectional view through a water supply tank showing the valve applied.

Fig. 2 is an enlarged vertical sectional view through the valve structure.

Fig. 3 is a horizontal sectional view on line 3—3 of Fig. 2.

Fig. 4 is a detail view of the supporting ends of the brackets for the tubular valve stem.

Fig. 5 is a detail sectional view of the lower flared end of the tubular valve stem showing the means to engage said flared end.

Referring more especially to the drawings 1 designates a conventional form of domestic or farm water tank, which acts as a supply tank for supplying water through a water system of a farm house or to other, water trough and like, or as a supply tank to the entire system interiorly of the farm house or to points exteriorly thereof, and 2 denotes a valve as a whole for controlling the outflow of the water from the tank. This valve comprises a body casing 3, there being an extensible threaded tubular extension 4 threaded at 5 into the upper part of the casing 3. This extension 4 passes through an opening 6 of the bottom 7 of the tank 1, there being nuts 8 and 9 in contact with the upper and lower surfaces of the bottom 7 and threaded on the extension to insure a water tight joint, there being packing 10. The upper end of the extension 4 on its interior terminates in a conical valve seat 11, with which the cone or conical valve 12 coöperates, in order to control the outflow of the water from the tank. This valve 12 is provided with upwardly and downwardly extending tubular valve stems 13 and 14, the passages through which are in communication through the medium of the passage 15 through the valve 12. A bracket 16 is secured at 17 to the inner surface of one of the sides of the tank 1. This bracket 16 is provided with an integral sleeve 18, the vertical opening 19 of which is rectangular in cross section. The valve stem 13 (which is axially alined with the stem 14) is provided with a rectangular portion 20, which is guided in the opening 19. The valve stem 13 extends the height of the tank 1 and terminates at the upper marginal edge of the tank 1, in fact a little above the marginal edge. An outlet pipe 21 is connected to the valve casing 3 by means of a coupling. This coupling comprises the fitting 22 which is threaded at 23 to the pipe 21 and is provided with a flange 24 at its upper end, held in contact with the flange 25 of the casing 3 by the circular collar 26 (angular in cross section) as shown. A flange 27 of the collar engages under the flange 24. The valve casing 3 has an offset chambered out portion 28. Journaled in bearings 29 of the opposing walls of said chambered out portion 28 is a rocking pin or shaft 30, the ends of which are mounted in packing glands 31 and 32. A cylindrical sleeve 33 is secured on the rocking pin 30 to rock therewith by means of a transverse pin 34. This sleeve has a radial arm 35, the upper edge of which at its end is provided with a concave bearing surface 36, in which the lower end of the valve stem 14 engages. The lower end of the valve stem has a slight movement in the concave bearing 36 as the rocking pin 30 is rocked. The lower end of the valve stem at two diametrically opposite points is flared outwardly, which portions are designated by the numerals 37 in Fig. 5. By means of these flared portions 37 the edge of the concave bearing does not prevent a free passage of the air downwardly through the stems 13 and 14. By means of the tubular valve stems 13 and 14 air at all times is allowed to enter the outlet pipe 21 below the valve 12, and below the upper surface of the body of the water in the tank 1, since the valve stem terminates above the upper surface of the water. The object in permitting air to enter the outlet pipe 21 is to prevent the pipes of the system between the valve and other auxiliary watering tanks or troughs or between the valve and the points of consumption of the water in the farm house or elsewhere, from freezing, as well as preventing the valve from freezing. Also by the admission of said air the pipe below the valve 12 is allowed to thoroughly drain, hence preventing freezing. An arm or lever 38 is secured by a pin 39 on one end of the rocking pin 30 and has a cord or cable 40 attached thereto. By imparting a pull on the cord or cable 40 the rocking pin may be rocked, causing the arm 35 to raise or unseat the valve, thereby allowing water to pass out through the valve casing and into the pipe 21. The tank 1 may be filled by means of the pipe a, which may be connected to any suitable mechanism (not shown) for supplying water into the pipe.

The invention having been set forth what is claimed as new and useful is:—

In a valve, a casing, a tank to the bottom of which said casing is fixed, said casing having a valve seat, a valve coöperating with the seat and provided with upwardly and downwardly projecting tubular stems having a passage of communication through the valve, whereby air is allowed to enter the casing from above the surface of the water, the lower end of the downwardly extending tubular stem being flared transversely, a rockable arm mounted in the valve casing and engaging the flared end of the valve stem for opening the valve, said flared end of the tubular stem being flared to such an extent that it will form an outlet of greater size than the passage in the tubular stem when the rockable lever is in contact with the end of the tubular stem, means for guiding the upward movement of the valve and tubular stems so that the transverse flared end of the downwardly extending tubular stem will at all times contact with the rockable arm at substantially a right angle thereto, and means for rocking the rockable arm.

In testimony whereof I have signed my name to this specification in the presence of two subscribing witnesses.

JACOB P. HAFFNER.

Witnesses:
CATHERINE E. COBB,
E. L. COBB.

Copies of this patent may be obtained for five cents each, by addressing the "Commissioner of Patents, Washington, D. C."